(12) United States Patent
Erickson (10) Patent No.: US 9,735,712 B2
(45) Date of Patent: Aug. 15, 2017

(54) ROADWAY RENEWABLE ENERGY GENERATION SYSTEM AND METHOD

(71) Applicant: Michael J. Erickson, Herndon, VA (US)

(72) Inventor: Michael J. Erickson, Herndon, VA (US)

(73) Assignee: Michael J. Erickson, Herndon, VA (US)

( * ) Notice: Subject to any disclaimer, the term of this patent is extended or adjusted under 35 U.S.C. 154(b) by 0 days.

(21) Appl. No.: 14/776,197

(22) PCT Filed: Mar. 14, 2014

(86) PCT No.: PCT/US2014/028128
§ 371 (c)(1),
(2) Date: Sep. 14, 2015

(87) PCT Pub. No.: WO2014/152889
PCT Pub. Date: Sep. 25, 2014

(65) Prior Publication Data
US 2016/0036354 A1 Feb. 4, 2016

Related U.S. Application Data

(60) Provisional application No. 61/784,536, filed on Mar. 14, 2013.

(51) Int. Cl.
*H02K 35/06* (2006.01)
*H02N 11/00* (2006.01)
(Continued)

(52) U.S. Cl.
CPC ............ *H02N 11/002* (2013.01); *E01C 1/00* (2013.01); *E01C 9/00* (2013.01); *F03G 7/08* (2013.01); *H02K 7/18* (2013.01)

(58) Field of Classification Search
CPC ....................................................... H02K 7/18
(Continued)

(56) References Cited

U.S. PATENT DOCUMENTS 3,944,855 A * 3/1976 Le Van ............... H02K 7/1853
310/69
4,239,974 A * 12/1980 Swander .................. H02J 7/32
290/1 R (Continued)

FOREIGN PATENT DOCUMENTS

| GB | 2413016 A * 10/2005 | .......... H02K 7/1853 |
| WO | 2012099706 A2 7/2012 | |
| WO | 2012151241 A2 11/2012 | |

OTHER PUBLICATIONS

Applicant Initiated Interview Request Form, Nov. 14, 2016.*
International Search Report and Written Opinion No. PCT/US14/028128 mailed Jul. 24, 2014.

*Primary Examiner* — Tho D Ta
(74) *Attorney, Agent, or Firm* — Brundidge & Stanger, P.C.

(57) ABSTRACT

A roadway renewable energy generation system and method, that includes a plurality of plunger devices, electrically connected in series, and each plunger device configured to generate a predetermined amount of electricity, through reciprocating linear motion, when actuated by an object; a plurality of grooves formed within a ground surface configured to house the plurality of plunger devices therein, wherein a top portion of each plunger device extends a predetermined distance above the ground surface; a transformer configured to transform the electricity generated by the plurality of plunger devices; and a storage device configured to store the electricity from the transformer. The system is embedded into roadways and parking garages/ramp entrances, for example, to enable electricity generated (Continued)

when each plunger device is depressed as the vehicle tires pass over the roadways to be stored and reused for electric vehicles and power/utility grids.

20 Claims, 8 Drawing Sheets

(51) Int. Cl.
    *F03G 7/08*     (2006.01)
    *E01C 1/00*     (2006.01)
    *E01C 9/00*     (2006.01)
    *H02K 7/18*     (2006.01)

(58) Field of Classification Search
    USPC .......................................................... 290/1 R
    See application file for complete search history.

(56) References Cited

U.S. PATENT DOCUMENTS

| | | | | |
|---|---|---|---|---|
| 4,614,875 A * | 9/1986 | McGee | ................ | H02K 7/1853 290/1 C |
| 5,347,186 A * | 9/1994 | Konotchick | ......... | H02K 7/1876 310/17 |
| 7,102,244 B2 * | 9/2006 | Hunter, Jr. | ............ | B60L 11/182 290/1 R |
| 7,164,211 B1 * | 1/2007 | Tafoya | ................... | H02K 35/06 290/1 R |
| 8,629,572 B1 * | 1/2014 | Phillips | ................... | F03B 13/16 290/42 |
| 2002/0089309 A1 * | 7/2002 | Kenney | ................ | H02K 7/1853 322/1 |
| 2005/0146220 A1 | 7/2005 | Hamel | | |
| 2006/0125325 A1 * | 6/2006 | Beaulieu | ................ | B60G 13/14 310/12.12 |
| 2007/0257495 A1 * | 11/2007 | Kim | ........................ | F03G 7/08 290/1 R |
| 2007/0264081 A1 * | 11/2007 | Chiu | ........................ | E01C 9/00 404/71 |
| 2009/0195226 A1 * | 8/2009 | Abramovich | ........... | E01B 26/00 322/2 R |
| 2011/0215589 A1 | 9/2011 | Chen | | |
| 2011/0276194 A1 | 11/2011 | Emalfarb | | |
| 2012/0211996 A1 | 8/2012 | Jang | | |

* cited by examiner

ROADWAY RENEWABLE ENERGY GENERATION SYSTEM AND METHOD

This PCT application claims priority to U.S. Provisional Application Ser. No. 61/784,536 filed on Mar. 14, 2013, entitled "Energy Generation System and Method," by Erickson, the contents of which are incorporated herein in its entirety.

BACKGROUND OF THE INVENTION

1. Field of the Invention

The present invention relates to a roadway renewable energy generation system and method. Particularly, a linear motion energy generation (i.e., harvesting) system including a plurality of plunger devices embedded into ground surfaces traveled by vehicles, which captures variable frequency electricity generated by vehicles causing intermittent linear motion of the plunger devices and harvesting the electricity for use.

2. Description of the Related Art

Today, some energy generation systems harvest kinetic energy using external components such as a regenerative brake system or mechanical treadles which are depressed to produce energy resulting from a decelerating vehicle. Other systems use a form of peristaltic harvester that collaborates with a deformable roadway surface, which compresses a fluidizing surface that interacts with a mechanical fixture to produce electrical energy. Yet other systems create a regenerative shock absorber for installation on the vehicle. All of these systems require either external components of the system or additional components installed on the vehicles in order to produce the desired energy.

SUMMARY OF THE INVENTION

An embodiment of the present invention provides a roadway renewable energy generation system comprising a plurality of plunger devices, electrically connected in series, and each plunger device configured to generate a predetermined amount of electricity, through reciprocating linear motion, when actuated by an object, a plurality of grooves formed within a ground surface configured to house the plurality of plunger devices therein, wherein a top portion of each plunger device extends a predetermined distance above the ground surface, a transformer configured to transform the electricity generated by the plurality of plunger devices, and a storage device configured to store the electricity from the transformer. The storage device may be connected with a recharging station for electric vehicles (EV) and hybrid electric vehicles (HEV) for supplying the electricity stored thereto, and for power/utility grids.

Another embodiment of the present invention provides a method for generating energy comprising electrically connecting, a plurality of plunger devices in series and embedding the plurality of plunger devices within a ground surface wherein a top portion of each plunger device extends a predetermined distance above the ground surface; generating a predetermined amount of electricity via the plurality of plunger devices, when actuated by an object; transforming the electricity generated via a transformer; and storing the electricity after transforming. The stored energy may later be sold to power/utility grid for servicing the community through recharging stations and virtual power plants.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Figure 7:
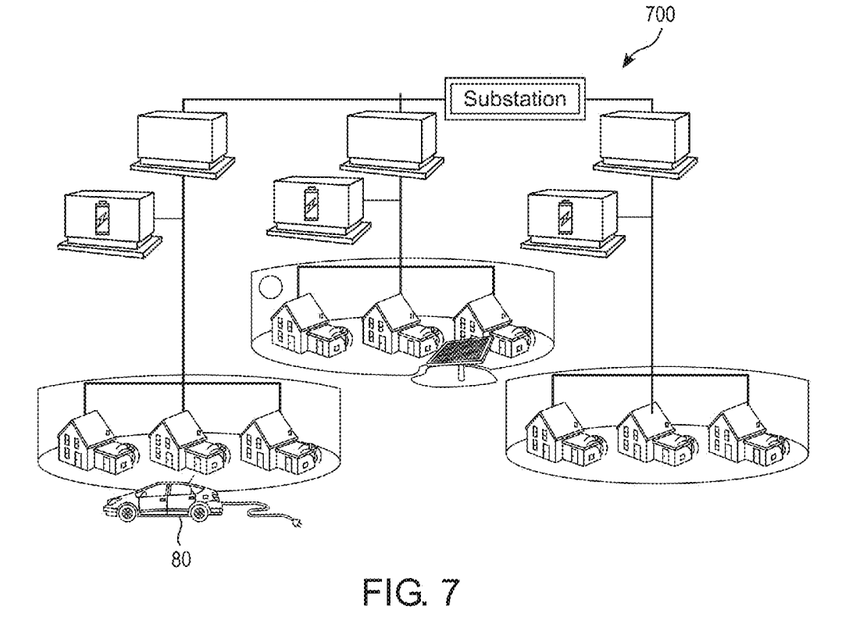
FIG. 7 is a block diagram illustrating the implementation of the system of FIG. 1 with a local/regional/Virtual Power Plant (VPP) and energy micro-grids in accordance with embodiments of the present invention.
Figure 9:
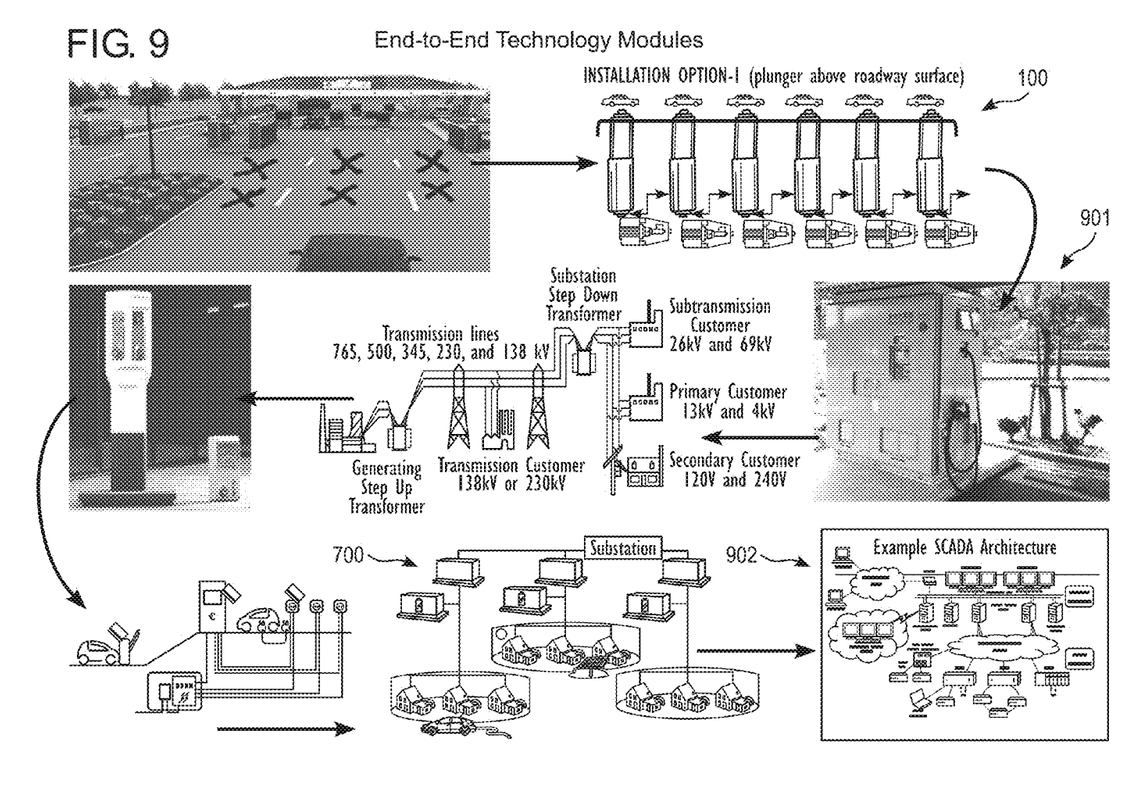
FIG. 9 is a diagram illustrating a plurality of examples of end-to-end technology modules for implementation of the system of FIG. 1 in accordance with one or more embodiments of the present invention.

The present invention as will be described in greater detail below provides a roadway renewable energy generation system which implements a plunger system including a plurality of plunger devices embedded into a ground surface of a roadway to generate storable electricity for use by an electric vehicle and a virtual power plant (VPP) and utility grid. The system may include Vehicle-to-Grid (V2G) circuits that allows the electric vehicles to communicate with the utility grid through a recharging station (901 as depicted in FIG. 9), a control system (902 as depicted in FIG. 9) or the VPPs (700 as depicted in FIG. 7) such that the unused electricity from the electric vehicle can be transmitted back into the utility grid. The present invention provides various embodiments as described below. However it should be noted that the present invention is not limited to the embodiments described herein, but could extend to other embodiments as would be known or as would become known to those skilled in the art.

Figure 1:
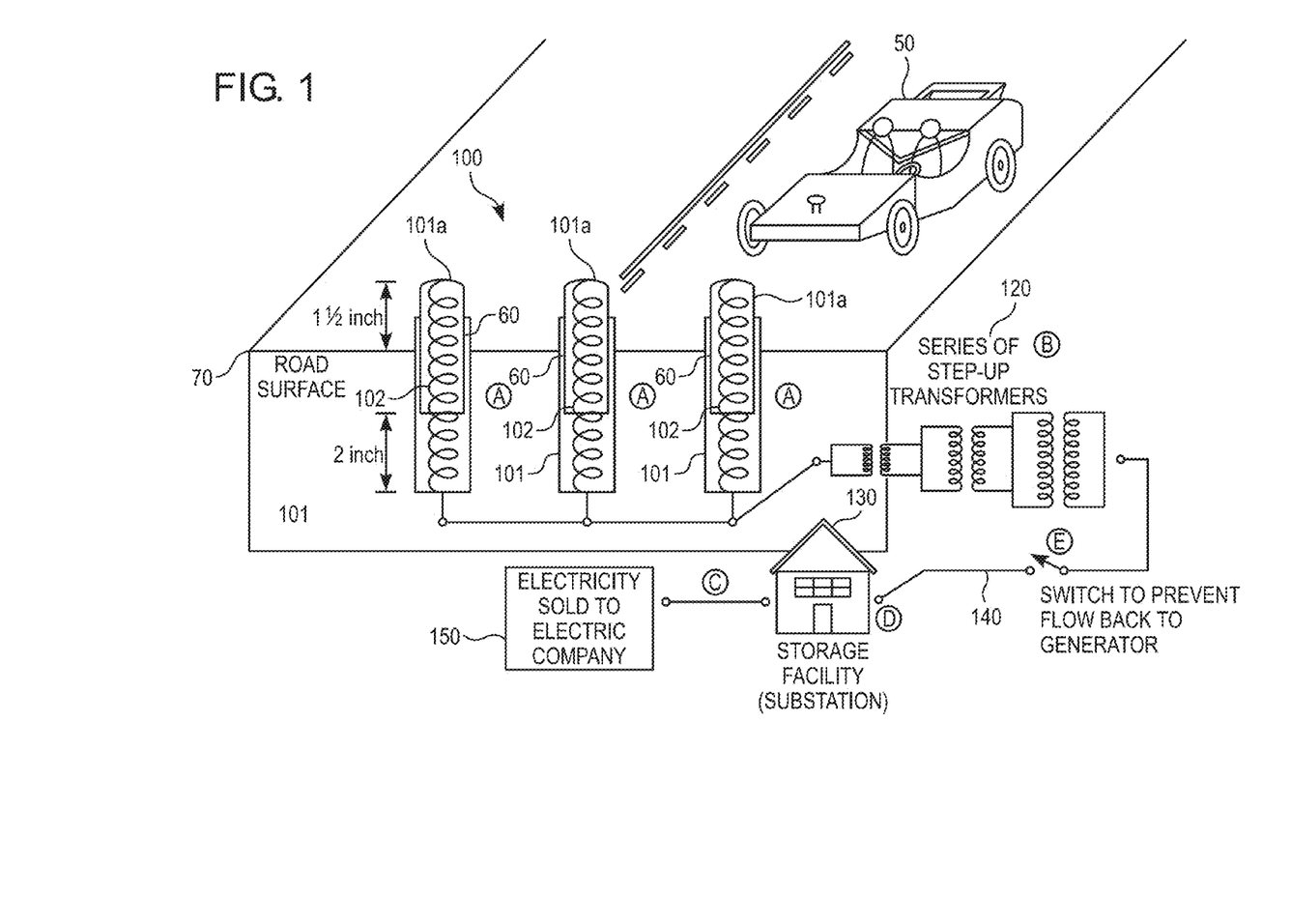
FIG. 1 is a schematic view of a roadway renewable energy generation system that can be implemented within one or more embodiments of the present invention.

FIG. 1 is a schematic view illustrating a roadway renewable energy generation system 100 that comprises a plurality of plunger devices 101, electrically connected in series. According to one or more embodiments, each plunger device 101 is configured to generate a predetermined amount of electricity, through reciprocating linear motion, when actuated by an object 50 (e.g., a vehicle).

The system 100 may include a central magnet array assembly comprised of a plurality of axially-aligned, stacked cylindrical magnets such that during deployment, an inner coil comprising concentric cylindrical coil windings surrounds a perimeter of the plunger devices 101. According to one or more embodiments, each plunger device 101 comprises a spring mechanism 102 to be depressed and released either individually, or in collaboration with a plurality of other individual spring mechanisms 102 via the object 50, and a generator 104 which generates the electricity based upon the depression or release of one or more of the spring mechanisms 102. The spring mechanisms 102 may be formed of a material comprising at least one of steel, iron, neodymium, boron, samarium, strontium, cobalt, nickel, aluminum or other alloy. The spring mechanisms 102 are not limited to being formed of a particular material and may vary accordingly.

According to an embodiment of the present invention, each spring mechanism 102 may comprise a rack and pinion assembly.

According to one or more embodiments, a plurality of grooves 60 are formed within a ground surface 70 and are configured to house the plurality of plunger devices 101 therein. Each groove 60 houses a corresponding plunger device 101. According to one embodiment, a top portion 101a of each plunger device 101 extends a predetermined distance above the ground surface 70.

According to an embodiment of the present invention, the predetermined distance may range from approximately ½ inch to approximately 2 inches, however, the present invention is not limited hereto and may vary accordingly. Each plunger device 101 generates electricity when depressed individually, and generates electricity when released after being depressed.

Alternatively, according to another embodiment of the present invention, the system 100 may comprises a housing system wherein an upper portion of the housing system includes the plurality of plunger devices 101 therein and lies a predetermined distance above the ground surface 70, wherein the plurality of plunger devices 101 collaboratively generates electricity when the housing system is depressed, and to generate electricity when released after being depressed.

The system 100 further comprises one or more transformers 120 configured to transform the electricity generated by the plurality of plunger devices 101. According to one or more embodiments, the transformers 120 comprise a series of step-up, step-down, or a combination of step-up and step-down transformers. The present invention is not limited to any particular number of transformers or types of transformers and may vary accordingly.

The system further comprises a storage device 130 configured to store the electricity from the transformer 120. The storage device 130 may be connected with a recharging station for electric vehicles (EV) and hybrid electric vehicles (HEV) for supplying the electricity stored thereto. The recharging station may be connected to a utility grid 150, and the recharging station and the electric vehicles and hybrid electric vehicles each includes a Vehicle-to-Grid (V2G) circuit that allows each electric vehicle and each hybrid electric vehicle to communicate with the utility grid through the recharging station, to sell electricity from the electric vehicle and the hybrid electric vehicle back into the utility grid.

Further, according to another embodiment, the storage device 130 is connected directly to the transformer 120 to modify the accumulated electricity to correspond to appropriate levels for upload to the utility grid.

The system further comprises a switch device 140 disposed between the transformer 120 and the storage device 130 and configured to switch on and off a flow of the electricity from the transformer 120 to the storage device 130. The switch device 140 prevents the flow of electricity back to the generator 104 of each plunger device 101.

According to one embodiment, during operation of the plunger devices 101, electricity is accumulated within each plunger device 101 until a minimum amount of electricity is accumulated, and the minimum amount of electricity accumulated is then transferred to the transformer 120.

Figure 8:
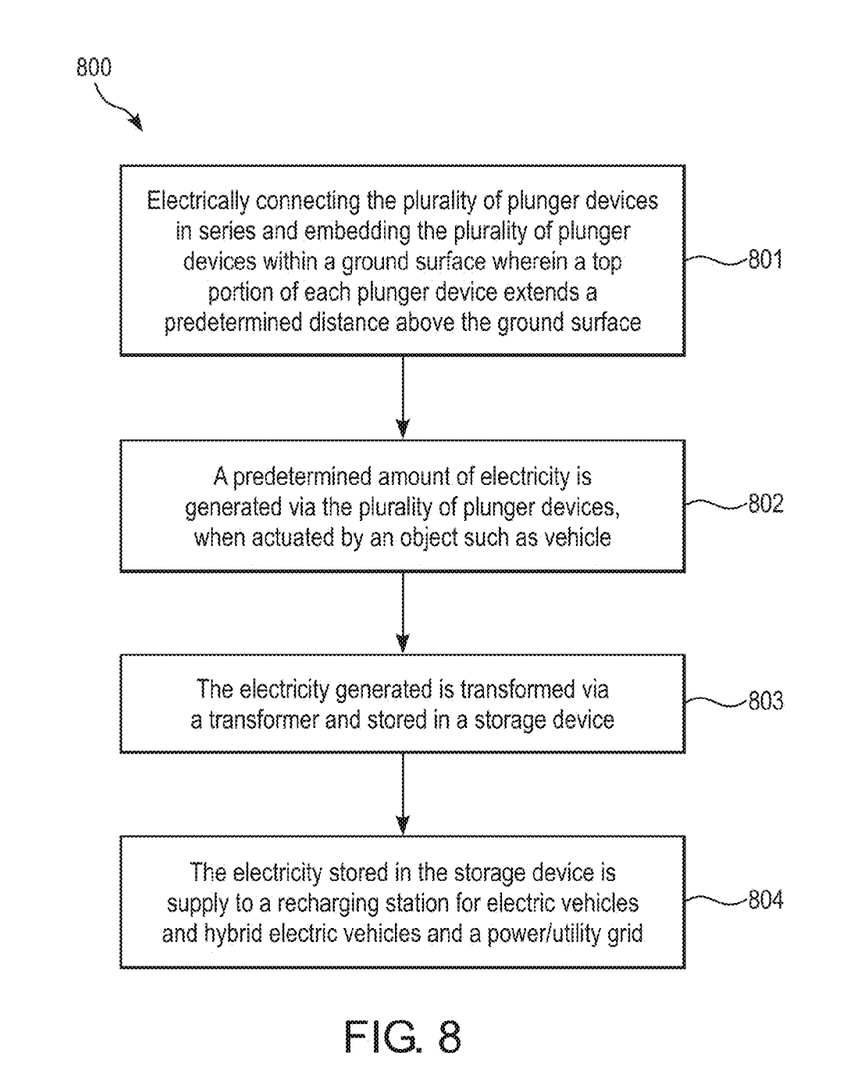
FIG. 8 is a flowchart illustrating a method for generating energy using the system of FIG. 1 in accordance with one or more embodiments of the present invention.

The plunger devices 101 are configured as clusters of distributed generation installations which are aggregated to form Energy Generation sites which form a local/regional Virtual Power Plant (VPP), these clusters of distributed generation installations are collectively run by a central control entity. According to one embodiment of the present invention, the central control entity may be a Supervisory Control and Data Acquisition (SCADA) system as depicted in FIG. 8.

Figure 2:
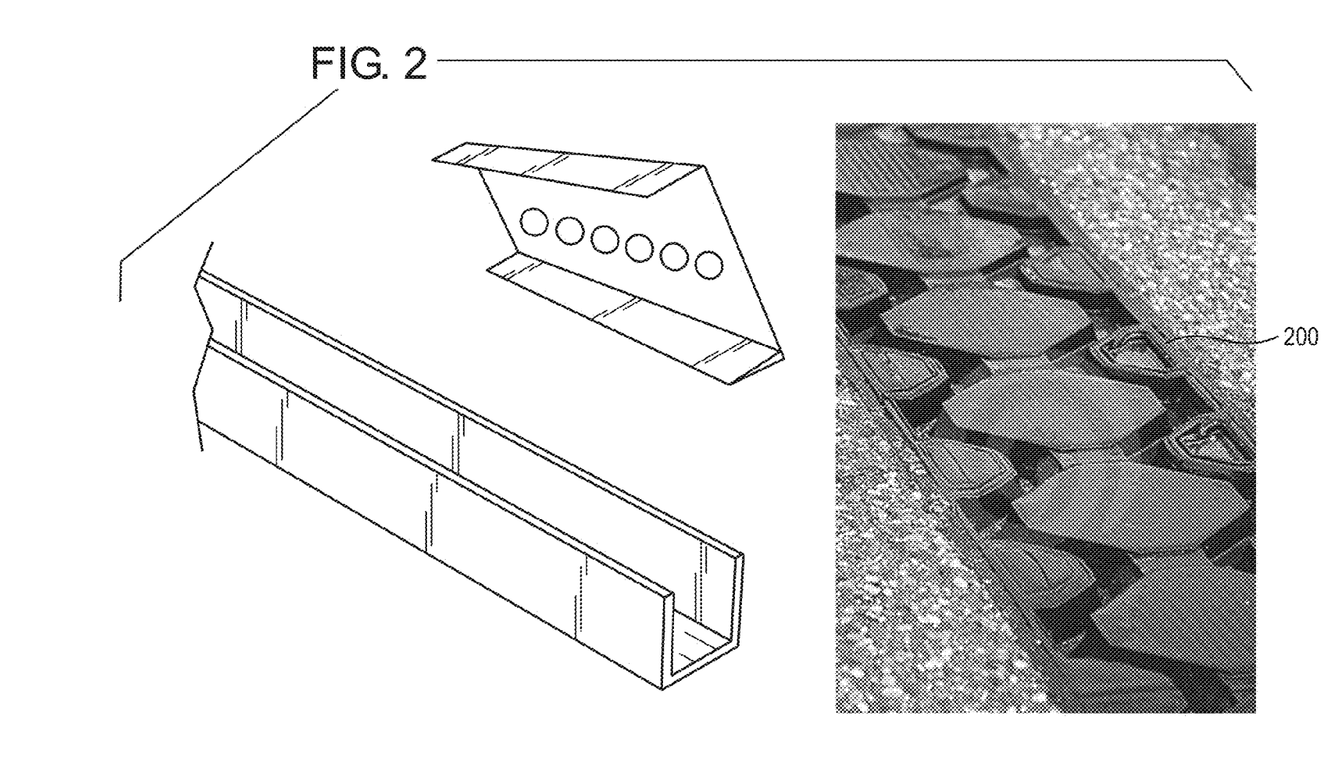
FIG. 2 is roadway electrical track assembly including the plurality of plunger devices of FIG. 1 that can be implemented within embodiments of the present invention.

FIG. 2 is roadway track assembly 200 which includes the plurality of plunger devices 101 of FIG. 1. The track assembly 200 is made of male and female corresponding components plunger holes cut therein corresponding to the plunger devices 101, to allow for the upward and downward motion of the plunger devices 101. According to an embodiment, the plunger devices 101 are disposed within the track assembly 200 and the set is then installed in pre-cut grooves cut horizontally into the ground surface (e.g., across a roadway). Optionally, rubberized caps may be used to cover the system 100 to lessen the physical impact when vehicles 50 pass over the system 100.

Figure 3:
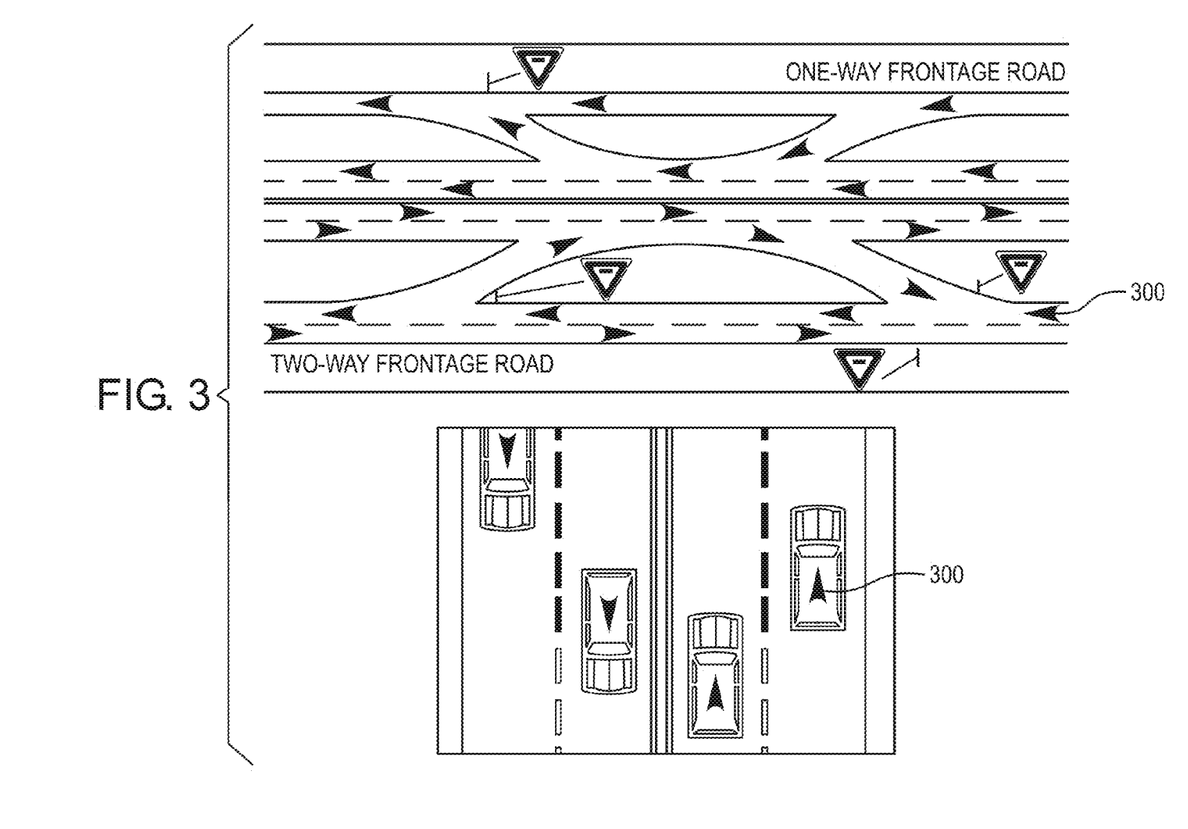
FIG. 3 is an example of a deployment site for deploying the system of FIG. 1 that can be implemented within embodiments of the present invention.

An example of deployment sites along roadways are shown in FIG. 3. In FIG. 3, potential deployment sites 300 are shown by the arrowheads along the roadways. When vehicles 50 pass over the sites 300, electricity is generated therefrom and transformed via the transformers 120 and stored within the storage device 130 for further use. The amount of electricity may be large energy volumes dependent upon the number of vehicles 50 to pass over the sites 300. This electricity may be used within electric vehicles and within power/utility grids.

Figure 4:
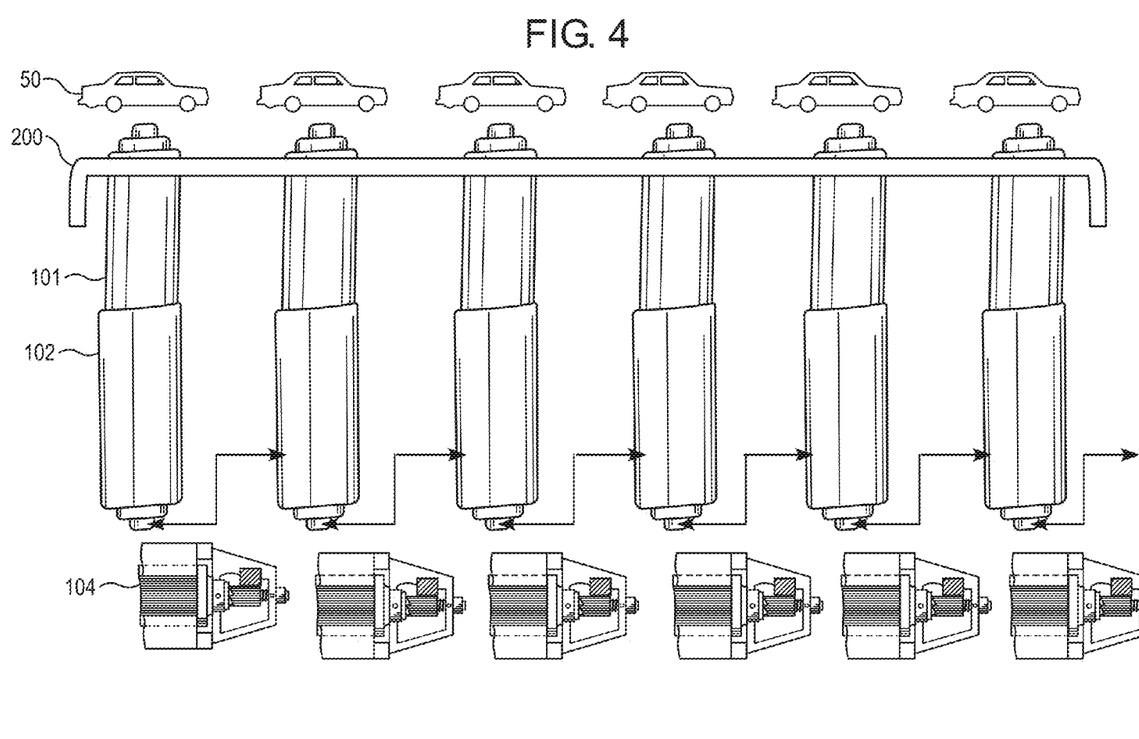
FIG. 4 is a schematic view illustrating an above ground surface implementation of the system of FIG. 1 that can be implemented within embodiments of the present invention.

FIG. 4 is a schematic view illustrating an above ground surface implementation 400 of the system 100 similar to the implementation shown in FIG. 1. As shown in FIG. 4, the plunger devices 101 may be disposed above the ground surface 60 a predetermined distance. The vehicles 50 may travel over the plunger devices 101, depressing them individually to thereby be generate energy to be used. The vehicles 50 are typically traveling across a stretch of roadway at surface areas where volumes of vehicles 50 are inherently slowed and constricted, for example, toll booths and bridges. The plunger devices 101 are installed within a track assembly 200 and the track assembly 200 has holes therein such that the top portions 101a of the plunger devices 101 project slightly above the track assembly 200 and above the ground surface 60 causing the plunger devices 101 to retract into the track assembly 200 to generation of electricity individually when depressed.

Figure 5:
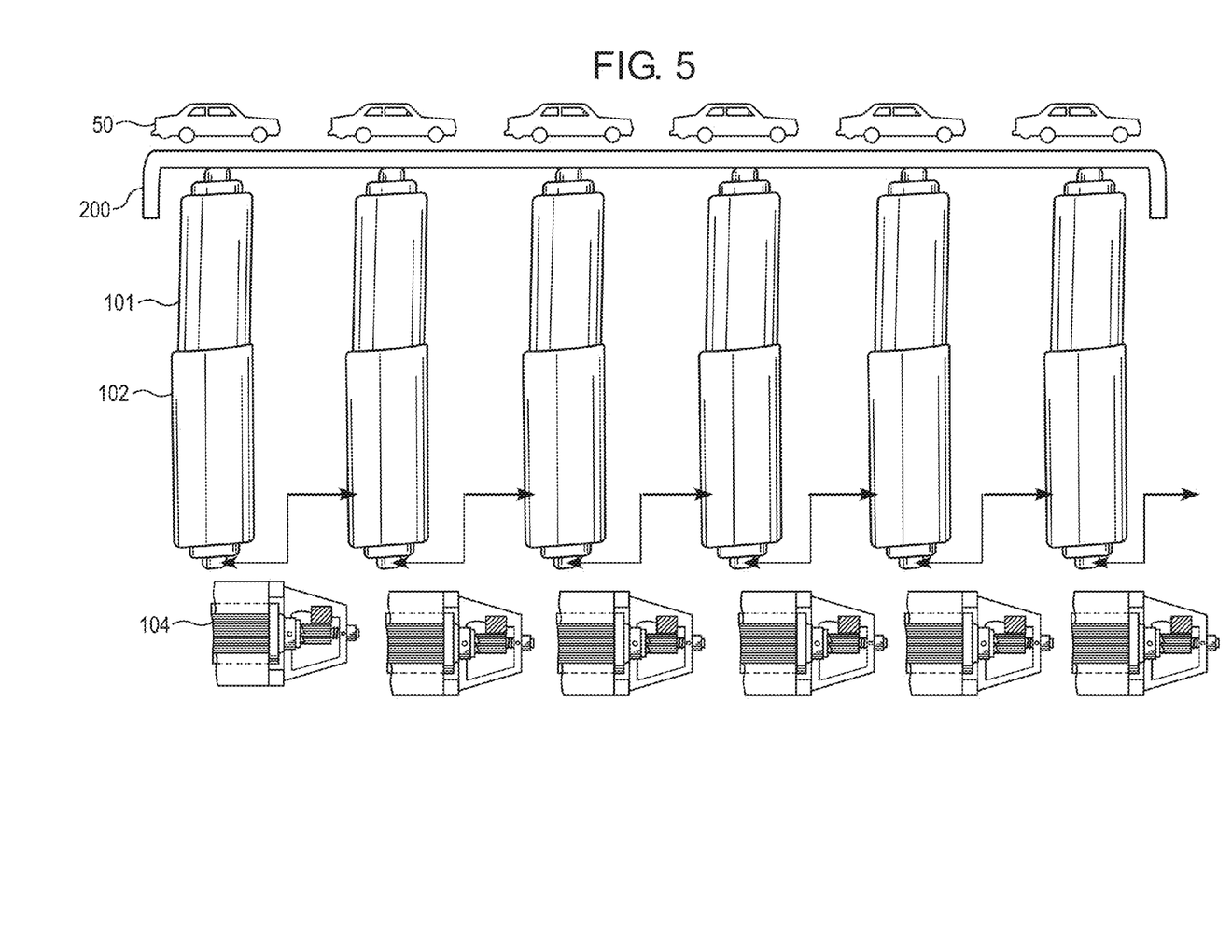
FIG. 5 is a schematic view illustrating a below ground surface implementation of the system of FIG. 1 that can be implemented within alternative embodiments of the present invention.

FIG. 5 is a schematic view illustrating a below ground surface implementation 400 of the system 100. As shown, the track assembly 200 does not include holes therein, therefore, when vehicles 50 pass over the track assembly 200, the entire track assembly 200 include the plunger devices 101 retract simultaneously.

Figure 6:
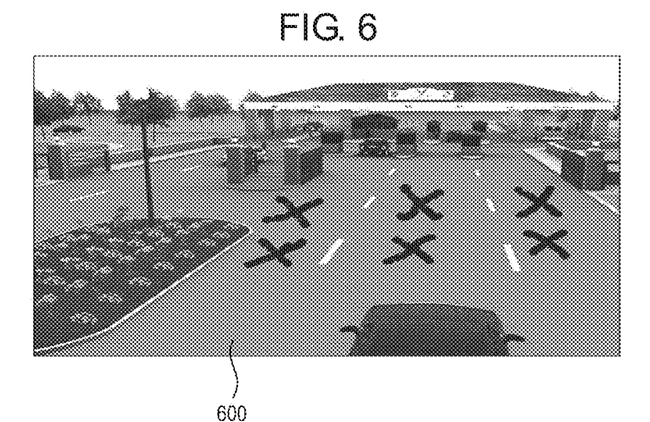
FIG. 6 is a pictorial view of example of installation locations for the system of FIG. 1 that can be implemented within embodiments of the present invention.

FIG. 6 is a pictorial view of example of installation locations 600 as indicated by the "X" for installation of system 100. As shown, the system 100 may be installed near toll booths or gates for accessing various locations. As the vehicles 50 approach the installation locations 600 the speed thereof is reduced, each plunger device 101 of the system 100 generates electricity through reciprocating linear motion when actuated by the vehicles 50.

FIG. 7 is a block diagram illustrating the implementation of the system 100 with an example local/regional/Virtual Power Plant (VPP) 700 and energy micro-grids for supplying energy to the community. The system 100 may include Vehicle-to-Grid (V2G) circuits that allows the electric vehicles to communicate with the utility grid 150 through a recharging station, a control system such as a SCADA system or the VPPs 700 such that the unused electricity from the electric vehicle 80 can be transmitted back into the utility grid 150.

FIG. 8 is a flowchart illustrating a method 800 of generating energy via the system 100. The method 800 begins at operation 801 which includes electrically connecting the plurality of plunger devices 101 in series and embedding the plurality of plunger devices 101 within a ground surface 70 wherein a top portion of each plunger device 101 extends a predetermined distance above the ground surface 70.

From operation 801 the process continues to operation 802 where a predetermined amount of electricity is generated via the plurality of plunger devices, when actuated by an object such as vehicle 50.

The process continues to operation 803 where the electricity generated is transformed via a transformer 120 and stored in a storage device 130.

According to one or more embodiments, the predetermined amount of electricity is generated when depressing and when releasing after depressing, each plunger device individually, or generated when depressing a housing of the plurality of plunger devices by depressing the plurality of plunger devices 101 collectively. The electricity is transferred to the transformer 120 after a minimum amount of electricity has accumulated within each plunger device 101.

From operation 803, the process continues to operation 804 where the electricity stored in the storage device 130 is supply to a recharging station for electric vehicles and hybrid electric vehicles and a power/utility grid.

FIG. 9 is a diagram illustrating a plurality of examples of end-to-end technology modules for implementation of the system 100 in accordance with one or more embodiments of the present invention. As shown in FIG. 9, the system 100 may be implemented at various deployment locations such as access gates, and toll booths, and may generate electricity to be supplied to power/utility grids 150 through recharging stations 901 for electric vehicles, and VPPs 700 or a control system 902 such as a SCADA system.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A roadway renewable energy generation system comprising:
   a plurality of plunger devices, electrically connected in series, and each plunger device configured to generate a predetermined amount of electricity, through reciprocating linear motion, when actuated by an object;
   wherein each plunger device comprises a plurality of axially-aligned, stacked cylindrical magnets such that during deployment, an inner coil comprising concentric cylindrical coil windings surrounds a perimeter of the plunger device;
   a plurality of grooves formed within a ground surface configured to house the plurality of plunger devices therein, wherein a top portion of each plunger device extends a predetermined distance above the ground surface;
   a transformer configured to transform the electricity generated by the plurality of plunger devices;
   a storage device configured to store the electricity from the transformer; and
   a switch device, configured to prevent the flow of electricity back to the plunger device, wherein the switch device is disposed between the transformer and the storage device.

2. The system of claim 1, wherein each plunger device is configured to generate electricity when depressed individually, and to generate electricity when released after being depressed.

3. The system of claim 1, further comprising:
   an upper portion of a housing system containing the plurality of plunger devices therein and lies a predetermined distance above the ground surface, wherein the plurality of plunger devices is configured to collaboratively generate electricity when the housing system is depressed, and to generate electricity when released after being depressed.

4. The system of claim 1, wherein the object is a vehicle.

5. The system of claim 1, wherein the switch device is configured to switch on and off a flow of the electricity from the transformer to the storage device.

6. The system of claim 1, wherein the storage device may be connected with a recharging station for electric vehicles (EV) and hybrid electric vehicles (HEV) for supplying the electricity stored thereto.

7. The system of claim 1, wherein the transformer comprises a series of step-up, step-down, or a combination thereof.

8. The system of claim 1, wherein each plunger device comprises:
 a spring mechanism configured to be depressed and released either individually, or in collaboration with a plurality of other individual spring mechanisms via the object; and
 a generator configured to generate the electricity based upon the depression or release of the spring mechanism or the plurality of spring mechanisms.

9. The system of claim 8, wherein electricity is accumulated within each plunger device until a minimum amount of electricity is accumulated, and the minimum amount of electricity accumulated is transferred to the transformer.

10. The system of claim 1, wherein the storage device is connected directly to the electrical transformer to modify the accumulated electricity to correspond to appropriate levels for upload to a power/utility Grid.

11. The system of claim 10, wherein the plunger devices are configured as clusters of distributed generation installations which are aggregated to form Energy Generation sites which form a local/regional Virtual Power Plant (VPP), said clusters of distributed generation installations are collectively run by a central control entity.

12. The system of claim 10, wherein the storage device is connected to a recharging station for an electric vehicle for supplying the electricity stored in the storage device to the electric vehicles and the hybrid electric vehicles, and the recharging station is connected to the utility grid, and wherein the recharging station and the electric vehicles and hybrid electric vehicles each includes Vehicle-to-Grid (V2G) circuits that allows each electric vehicle and each hybrid electric vehicle to communicate with the utility grid through the recharging station, to sell electricity from the electric vehicle and the hybrid electric vehicle back into the power/utility grid.

13. A method for generating energy comprising:
 electrically connecting, a plurality of plunger devices in series and embedding the plurality of plunger devices within a ground surface wherein a top portion of each plunger device extends a predetermined distance above the ground surface;
  wherein each plunger device comprises a plurality of axially-aligned, stacked cylindrical magnets such that during deployment, an inner coil comprising concentric cylindrical coil windings surrounds a perimeter of the plunger devices;
 generating a predetermined amount of electricity via the plurality of plunger devices, when actuated by an object; and
 transforming the electricity generated via a transformer; and storing the electricity in a storage device after transforming; and
 preventing the flow of electricity back to the plunger device using a switch device disposed between the transformer and the storage device.

14. The method of claim 13, wherein the predetermined amount of electricity is generated when depressing and when releasing after depressing, each plunger device individually, or generated when depressing a housing of the plurality of plunger devices by depressing the plurality of plunger devices collectively.

15. The method of claim 13, further comprising:
 transferring the electricity to the transformer after a minimum amount of electricity has accumulated within each plunger device.

16. The method of claim 13, wherein the object is a vehicle.

17. The method of claim 13, further comprising:
 supplying the electricity stored to a recharging station for electric vehicles and hybrid electric vehicles.

18. The method of claim 13, further comprising: supplying the electricity stored to a power/utility grid.

19. The method of claim 18, wherein the plunger devices are configured as clusters of distributed generation installations which are aggregated to form Energy Generation sites which form a local/regional Virtual Power Plant (VPP), said clusters of distributed generation installations are collectively run by a central control entity.

20. The method of claim 18, further comprising:
 supplying stored electricity to a recharging station for an electric vehicle, wherein the recharging station is connected to the utility grid, and
 wherein the recharging station and the electric vehicle and the hybrid electric vehicle each includes Vehicle-to-Grid (V2G) circuits that allows the electric vehicle and the hybrid electric vehicles to communicate with the utility grid through the recharging station, to sell electricity from the electric vehicle into the grid.

* * * * *